April 27, 1937.  L. C. DOMACK  2,078,903
SEAT FOR VALVES
Filed April 30, 1936
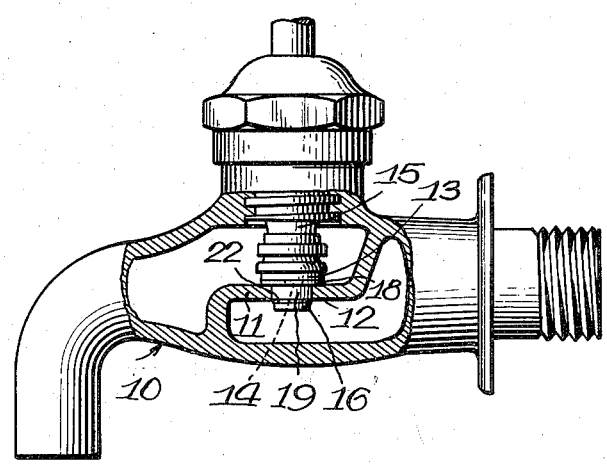
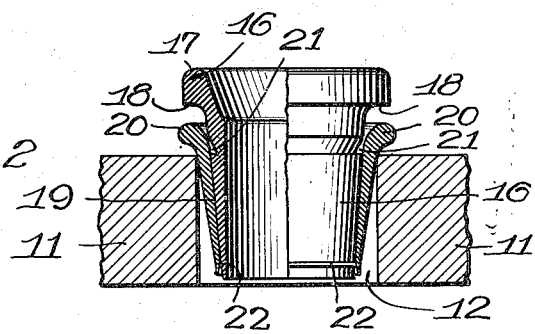
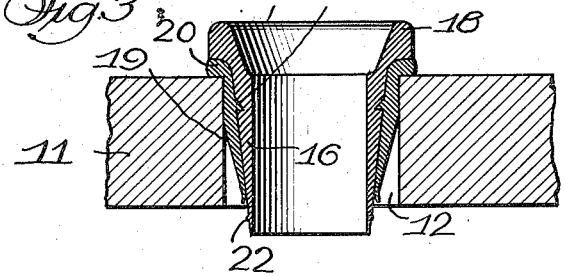
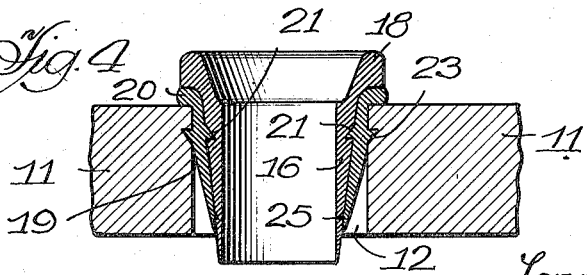
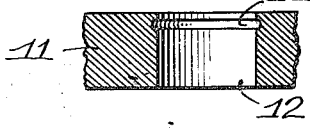
Inventor
Lawrence C. Domack,
By Maxwell F. Cargill, Atty.
Witness:

Patented Apr. 27, 1937

2,078,903

UNITED STATES PATENT OFFICE 2,078,903

SEAT FOR VALVES

Lawrence C. Domack, Elmwood Park, Ill., assignor of forty per cent to Kenneth Weiler, Elmwood Park, Ill.

Application April 30, 1936, Serial No. 77,165

3 Claims. (Cl. 251—167)

This invention relates to improvements in seats for valves.

One object of the invention is to provide a seat for a valve which can be inserted in threaded or unthreaded valve openings of cylindrical shape and is so constructed that it forms a fluid tight seal with the opening and anchors itself in position.

Another object of the invention is to provide a seat assembly comprising two relatively movable concentric annular members arranged to so coact during the positioning of the same in a valve opening that the inner member expands the outer member radially into sealing contact with the wall of the opening and interlocks the two members together and in one form of the invention provides a positive interlocking engagement also with the wall of the valve opening, to retain the seat in position.

In the drawing wherein certain embodiments of the invention are disclosed for the purpose of illustrating the principle thereof, Figure 1 is a sectional view of a conventional faucet having an improved seat assembly positioned in the valve opening thereof.

Figure 2 is an enlarged broken sectional view of an improved seat assembly illustrating the relation of the two annular members prior to being pressed into final position in a valve opening.

Figure 3 is an enlarged broken sectional view of the seat assembly in final position in a valve opening.

Figure 4 is a sectional view similar to Figure 3, but illustrating a grooved faucet diaphragm into which metal of the sheath is forced during the seating operation.

Figure 5 is a broken sectional view illustrating a diaphragm having a differently shaped groove.

In Figures 1 to 3 of the drawing, the form of the invention illustrated is adapted for use in faucets but it will be appreciated that the improvements may be used in many relations where a closely fitting seat is required.

In Figure 1, 10 generally indicates a water faucet of conventional form having a partition or diaphragm 11 provided with a cylindrical valve opening or passage 12 through which water flows when the valve is open. Some faucets are provided with threaded valve openings and threaded seats therein against which the gasket or washer 13 presses to close the faucet when the latter is closed, the gasket usually being secured by a screw 14 to the threaded valve stem 15. Many faucets, however, have no renewable threaded seats but are provided with a smooth or ground surface adjacent the valve opening and against which the washer 13 presses to shut off the water. These surfaces frequently become scored or rough after a period of use causing the faucet to leak. To remedy this the seats frequently are reground but special tools are required which generally are not readily available nor properly usable by the average householder. The present seats can be used to correct the difficulty mentioned and without the use of tools of any kind.

The present seat comprises an annular member 16 of suitable material, preferably of brass, the outer surface of the body of which is tapered preferably at an angle of approximately 85 degrees to the horizontal. The upper end 17 of the seat against which the gasket 13 presses, may be rounded in cross-section as illustrated in Figures 2 and 3 and is provided with a flange 18.

An annular sheath 19, of deformable material such as lead, is slidably carried on the exterior of the seat member, the contacting surfaces of the two members having the same taper angle. The exterior surface of the sheath 19 is, in the form illustrated, tapered also at an angle which reduces it to a relatively fine edge at the lower end, while the upper portion is substantially thicker and is provided with a continuous annular flange 20, which may flare outwardly as shown in Fig. 2.

The size of the assembled seat is such that it can be pressed easily or dropped into an opening 12 of a valve or faucet partition 11, as illustrated in Figure 2. Upon exerting downward pressure on the member 16, the sheath is pressed into the opening until the flange 20 contacts the partition 11 adjacent the upper margin of the opening 12. Further downward movement of the sheath is thus resisted by the flange but due to the fact that the member 16 is slidable within the sheath, the latter will be expanded radially into firm contact with the wall of the opening as illustrated in Figure 3, thus forming a water tight seal between the wall of the opening and the sheath and between the latter and the seat member 16. Where the valve opening is unusually small, the sheath may not pass into the same until the flange arrests further movement but in that event the sheath will likewise be expanded into anchoring and sealing contact with the wall of the valve opening when the member 16 is forced downwardly, although both members 16 and 19 may project a greater distance above the top of the partition 11 than is shown in Figure 3.

Since the walls of the valve openings generally are rough, the sheath material is forced into the surface depressions and becomes sufficiently anchored thereto to resist upward displacement.

It will be noted that due to the deformation of the sheath by the expanding or wedging action of the seat member 16 as it is moved downwardly to seating position, a substantial area of contact between the sheath and the wall of the valve opening is provided. The flange 20, contacting at the lower surface with the upper marginal area of the partition 11, provides additional sealing area between the sheath and partition to prevent leakage therebetween while the lower curved surface of the flange 18 contacts with the upper curved surface of the flange 20 and assists in retaining the member 16 against angular displacement.

The seat member 16 can be pressed into the final position shown in Figure 3 by screwing the valve stem 16 down firmly to water shut-off position after the seat assembly has been placed in the initial position shown in Figure 2.

To prevent the seat member 16 from being displaced upwardly from the sheath by the action or pressure of the liquid flowing centrally through the seat member when the valve is open, the member is preferably provided with an exterior groove 21 adjacent the upper portion thereof and into which some of the compressed sheath material flows under the radial pressure exerted thereon as the seat is being forced into position. The sheath and member 16 are thus interlocked in final or seated position as illustrated in Figure 3.

Adjacent the lower end of the member 16 a small annular bead 22 is illustrated which holds the sheath on the member 16 prior to use. The sheath is slid over the member 16 and due to the tapering surfaces of each of the members, only the lower relatively thin edge of the sheath will engage the bead. This frictional engagement is sufficient to retain the parts in assembled relation during handling and installation.

Should leakage develop between edge 17 of the member 16 and a gasket 13 due to wear or scoring of the edge, it may be smoothed by a conventional re-seating tool without removing the seat from the valve opening or by means of a suitable hooked tool, the seat may be removed and another one substituted in the manner described above.

As stated, the sheath is of deformable material, preferably lead or lead alloy which is sufficiently soft to deform under the pressure of the seating operation to form a water tight and anchoring connection with the wall of the valve opening and to interlock with a groove or equivalent recess in the seat member to assist in holding the latter in place. While others have proposed making valve seats having lead sheaths fixed to an annular seat member, it is novel insofar as I am aware, to provide a seat member which is relatively slidable within the sheath whereby a radial expanding action is provided as described. By thus expanding the sheath radially, the roughness of the walls of the valve opening increases the anchorage of the sheath thereto whereas a soft sheath which is pressed axially of the opening will be scored by irregularities of the walls and probably fail to provide and adequate seal. It is thus not necessary to ream out the valve openings prior to inserting one of the improved seats.

Due to the fact that valve openings vary somewhat in different makes of faucets the exterior wall of the sheath is tapered to enable the same to seat within the prevailing different size openings, otherwise the exterior wall could be cylindrical and of a diameter enabling the same to be dropped or pressed easily into the valve opening and thereafter expanded radially into sealing and anchoring contact with the wall of the valve opening by depressing the tapered seat member as above described.

In Figure 4 the construction may be the same as that above described except that the wall of the valve opening 12 is shown provided with a recess, such as a channel 23, V-shaped in cross section, or of a more rounded shape as shown at 24 in Figure 5. As the inner seat member 16 is pressed to the position shown in Figure 4, as described above with respect to Figure 3, some of the soft metal of the sheath will flow radially into the groove or recess 23, as well as into the groove 21 of the inner member, whereby the sheath forms a lock which positively holds the seat assembly against upward dislodgment by the action of the water when the faucet is opened.

The groove or grooves in the diaphragm as described preferably are made by the faucet manufacturer in equipping his faucets with the improved seats although suitable depressions or grooves may be made by means of suitable tools in faucets already in use. The provision of such depressions or grooves 23 or 24 is desirable only where relatively high water pressure is encountered in use, since the seat structure illustrated in Figures 1 to 3 do not become displaced under ordinary conditions and where the walls of the valve openings are slightly rough. Where the valve openings in the diaphragm are so bored that smooth walls are provided, the provision of depressions or grooves therein provide suitable anchorage for the deformable sheath.

In Figure 4 a small groove 25 is shown in the lower portion of the inner member 16 into which some of the soft metal of the thin lower edge of the sheath 19 is pressed or flows in initially assembling the structure. This arrangement holds the parts together during handling prior to installation and performs the same function as the small rib 22 of the form shown in Figs. 2 and 3.

This application is a continuation in part of my co-pending application, Serial No. 65,353, filed February 24, 1936, for Valve seats.

While I have shown and described certain embodiments of my invention for the purpose of illustration, I do not wish to be restricted specifically thereto except as so limited by the appended claims.

I claim:

1. A valve seat assembly for a valve opening having an annular groove in the wall thereof comprising an inner tubular seat member having a tapered exterior provided with an annular groove therein, and an outer sheath member slidably positioned on the tapered exterior of said inner member, said sheath being of deformable material adapted to be expanded radially by relative movement of said inner member to force said sheath into sealing contact with the wall of said valve opening and to cause portions of said sheath material to flow into each of said grooves simultaneously with said movement of said inner member to prevent axial displacement of the inner member with respect to the valve opening.

2. A valve seat assembly comprising an exterior annular sheath of deformable material and an inner seat member slidable within said sheath and having a tapered exterior wall arranged to expand said sheath radially into anchoring and sealing contact with a wall of a valve opening, said inner seat member being provided with a recess into which material of said sheath can flow during the expansion of said sheath to effect an inter-locking of said members when in seated position.

3. A valve seat assembly comprising an exterior annular sheath of deformable material having interior and exterior tapered walls terminating at the lower end in a thin edge, an inner seat member slidable axially of said sheath and having an exterior tapered wall arranged to expand said sheath into anchoring and sealing contact with a wall of a valve opening, and means adjacent the lower end of said inner member for engagement by said thin edge for holding said members in assembled relation prior to installation in a valve opening.

LAWRENCE C. DOMACK.